US012789999B2

(12) United States Patent
Duchesne

(10) Patent No.: US 12,789,999 B2
(45) Date of Patent: Nov. 10, 2026

(54) ENERGY-AUTONOMOUS SEAT

(71) Applicant: AIRBUS ATLANTIC, Rochefort (FR)

(72) Inventor: Julien Duchesne, Saint Laurent de la Prée (FR)

(73) Assignee: AIRBUS ATLANTIC (FR)

( * ) Notice: Subject to any disclaimer, the term of this patent is extended or adjusted under 35 U.S.C. 154(b) by 101 days.

(21) Appl. No.: 18/844,772

(22) PCT Filed: Mar. 8, 2023

(86) PCT No.: PCT/FR2023/050311
§ 371 (c)(1),
(2) Date: Sep. 6, 2024

(87) PCT Pub. No.: WO2023/170365
PCT Pub. Date: Sep. 14, 2023

(65) Prior Publication Data

US 2025/0187731 A1 Jun. 12, 2025

(30) Foreign Application Priority Data

Mar. 8, 2022 (FR) ........................................ 2201998

(51) Int. Cl.
*B64D 11/06* (2006.01)

(52) U.S. Cl.
CPC ...... *B64D 11/0624* (2014.12); *B64D 11/0639* (2014.12)

(58) Field of Classification Search
CPC ........................ B64D 11/0624; B64D 11/0639
See application file for complete search history.

(56) References Cited

U.S. PATENT DOCUMENTS

| | | | | |
|---|---|---|---|---|
| 8,274,383 B2 * | 9/2012 | Mitchell | G07C 5/08 180/207.1 |
| 9,315,165 B2 | 4/2016 | Hollerer | |
| 2008/0149770 A1 | 6/2008 | Hoffjann et al. | |
| 2009/0005936 A1 * | 1/2009 | Browne | B60R 25/1004 297/217.2 |

FOREIGN PATENT DOCUMENTS

| | | | |
|---|---|---|---|
| DE | 102006020146 | 11/2007 | |
| DE | 102010055150 A1 * | 6/2012 | B60N 2/90 |
| DE | 102011122188 | 6/2013 | |
| EP | 2546145 | 1/2013 | |
| EP | 2896566 A1 * | 7/2015 | B64D 11/0624 |
| EP | 3050800 | 8/2016 | |

OTHER PUBLICATIONS

International Search Report for International Application No. PCT/FR2023/050311, dated May 15, 2023.

* cited by examiner

*Primary Examiner* — Anthony D Barfield
(74) *Attorney, Agent, or Firm* — Perman & Green, LLP

(57) ABSTRACT

A seat including a sitting portion and a backrest which are articulated to one another. The seat also including at least one electric actuator configured to make the sitting portion and/or the backrest movable. The seat includes an energy recovery device configured to recover kinetic energy produced by the seat and to transform the kinetic energy into electrical energy. The seat further including: an energy production device configured to produce electrical energy from an ambient energy source; and a storage device connected to the energy production device and to the actuator, and configured to store the electrical energy originating from the energy production device and from said at least one actuator.

8 Claims, 1 Drawing Sheet

ENERGY-AUTONOMOUS SEAT

CROSS REFERENCE TO RELATED APPLICATIONS

This application is a National Stage of International Application No. PCT/FR2023/050311, having an International Filing Date of 8 Mar. 2023, which designated the United States of America, and which International Application was published under PCT Article 21(2) as WO Publication No. 2023/0170365 A1, which claims priority from and the benefit of French Patent Application No. 2201998 filed on 8 Mar. 2022, the disclosures of which are incorporated herein by reference in their entireties.

BACKGROUND

Field

The present disclosure relates to a seat used to equip transport vehicles such as an aircraft.

Brief Description of Related Developments

Transport vehicles, such as aircrafts, are provided with seats enabling passengers to sit.

In general, these seats are electrically connected so as to offer to the passengers some services or conveniences, such as: different positions of the seat which could be up to fully lying position (bed), lighting, recharging outlets, TV sets, etc. The electricity is conventionally supplied by cables drawn under a floor on which the seat is installed and from a generator up to the seats.

Such cables do not allow for energy autonomy of the seat and bring in an additional mass to the vehicle. Yet, this goes against the objectives that the manufacturers have set henceforth, in particular that of reducing the weight of the vehicle as much as possible, especially in the aeronautical field.

In this context, the document US 2008/149770 A1 is known which proposes a seat including a fuel cell configured to supply devices and actuators with electric power.

SUMMARY

The present disclosure aims to provide an energy-autonomous seat, requiring no human intervention for supplying it with electric power.

To this end, it provides a seat including a sitting portion and a backrest articulated to one another, the seat also including at least one electric actuator configured to make the sitting portion and/or the backrest movable.

According to the disclosure, the seat comprises an energy recovery device configured to recover kinetic energy produced by the seat and to transform said kinetic energy into electrical energy, and further includes:

- an energy production device configured to produce electrical energy from an ambient energy source; and
- a storage device connected to the energy production device and to said at least one actuator, and configured to store the electrical energy originating from the energy production device and from said at least one actuator.

The seat includes a braking system configured to brake the backrest and/or the sitting portion in its movement, the recovery device being configured to recover the kinetic energy produced during braking by the braking system.

The seat thus proposed is autonomous in electrical energy. Indeed, thanks to the electrical energy generated by the production device and the actuator, any accessory or electronic component with which the seat could be provided is supplied with electricity.

Furthermore, the seat is energy self-sufficient, i.e. the human intervention is not necessary for the production device and the actuator to generate electricity or to enable supply thereof with electric power.

Preferred features that are particularly convenient for the seat according to the disclosure are set out hereinbelow.

The backrest is movable between a raised position and a lying position by means of said at least one actuator, the backrest forming, with the seat, a substantially flat first angle in the lying position, and a second angle in the raised position, the second angle being smaller than the first angle, the braking system being configured to brake the backrest in its movement from the raised position towards the lying position.

According to one aspect, the actuator is reversible and comprises the energy recovery device.

The energy production device comprises photovoltaic cells, the ambient energy source being a natural and/or artificial light.

The energy production device comprises at least one infrared receiver, the ambient energy source being an infrared radiation.

Said at least one infrared receiver is directed towards the backrest and/or the sitting portion.

The seat further includes a control device configured to control the storage device in order to distribute the stored electrical energy to electronic components of the seat.

More particularly, the storage device may be a battery or a capacitor.

BRIEF DESCRIPTION OF THE DRAWINGS

Other particularities and advantages of the disclosure will appear better from the description hereinafter made with reference to the appended drawings, given as non-limiting examples.

DETAILED DESCRIPTION

In the aspect described hereinafter, reference is made to a seat for an airplane passenger. This non-limiting aspect is given for a better understanding of the disclosure and does not exclude the use of the seat in another vehicle.

Figure 1:
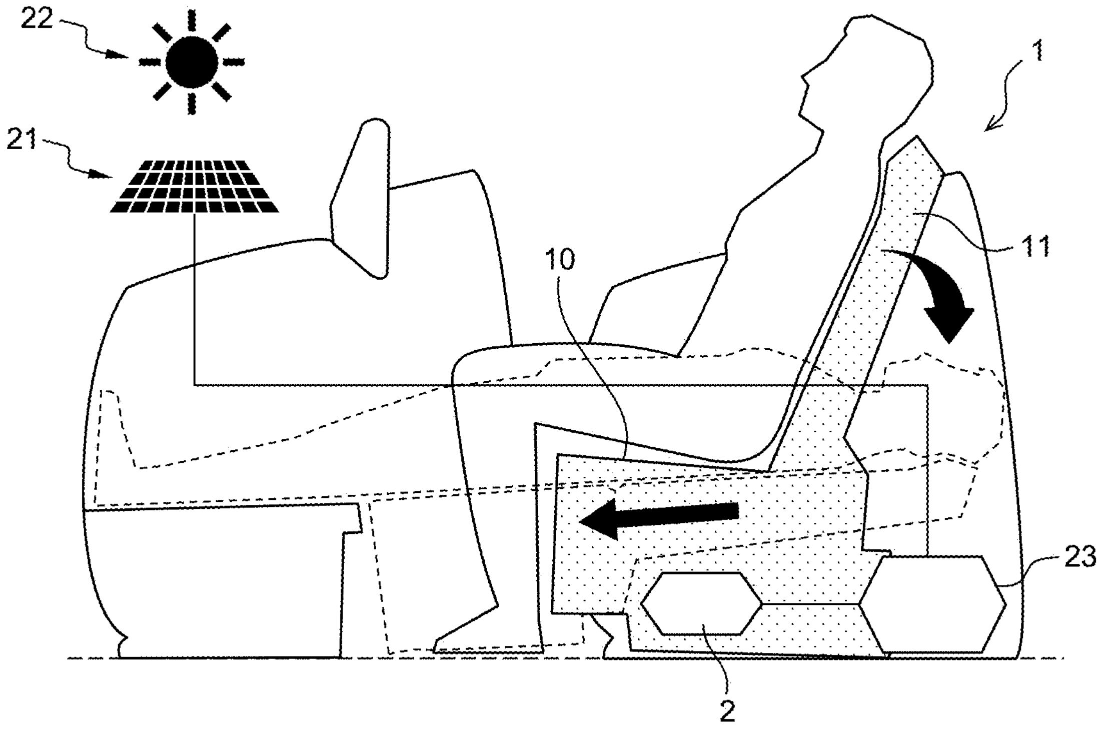
FIG. 1 is a schematic view of a seat according to an aspect in accordance with the disclosure.

FIG. 1 schematically shows a seat 1 according to an aspect of the disclosure, on which a passenger is seated.

The seat 1 includes a sitting portion 10, the latter referring to the portion of the seat on which a passenger can sit in the normal position.

The seat 1 also includes a backrest 11, the latter designating the portion of the seat on which the passenger can support his/her back.

In the present description, by “horizontal plane”, reference is made to a plane substantially parallel to the sitting portion 10 when the seat 1 is installed and ready for use. A horizontal plane is also substantially parallel to a floor on which the seat 1 is installed. A horizontal direction is a direction belonging to a horizontal plane.

The sitting portion 10 and the backrest 11 are articulated to one another. The backrest 11 is movable in rotation relative to the sitting portion 10 about a hinge axis. The hinge axis extends horizontally. Such an articulation is known and is therefore not shown in FIG. 1.

The backrest 11 is movable between a so-called raised position and a so-called lying position.

In the lying position, the backrest 11 forms an angle with the sitting portion 10, so-called the first angle, which is substantially flat. The lying position of the backrest 11 enables the passenger to lie on the seat.

In the raised position, the backrest 11 forms an angle with the sitting portion 10, so-called the second angle, smaller than the first angle. In particular, the second angle is close to the right angle. The raised position of the backrest 11 enables the passenger to sit in a conventional position corresponding to that usually used in airliners in the takeoff or landing phase for safety reasons. In general, the second angle is comprised between 90° and 100°.

The sitting portion 10 is movable according to a rectilinear translational movement, in a horizontal plane, between a forward position and a backward position.

The seat 1 also includes a base, not shown, which serves as a support for the sitting portion 10. Indeed, the base enables connection to the floor on which the seat 1 is installed. In general, the base is mounted on guide and sliding means (also not shown) assembled to the floor and enabling the translational movement of the sitting portion 10 between the forward position and the backward position.

The seat 1 can take on a rest configuration and a sleeping configuration. In the rest configuration, the sitting portion 10 is in the backward position and the backrest 11 in the raised position. In the sleeping configuration, the sitting portion 10 is in the forward position and the backrest 11 in the lying position.

The seat 1 includes at least one actuator 2 configured to make the sitting portion 10 and/or the backrest 11 movable.

In particular, the actuator 2 is an electric actuator such as an electric motor.

For example, the seat 1 may include a first actuator configured to move the sitting portion 10 and a second actuator configured to move the backrest 11. In particular, the first actuator is configured to move the sitting portion 10 between the forward position and the backward position. The second actuator is configured to move the backrest 11 between the raised position and the lying position.

In another aspect, the seat 1 may include one single actuator configured to both move the sitting portion 10 and the backrest 11. The unique actuator is configured to move the sitting portion 10 between the forward position and the backward position, and to move the backrest 11 between the raised position and the lying position.

Of course, the above-described two movements may be synchronized or carried out independently of one another.

The seat 1 includes a braking system, not shown, configured to brake the backrest 11 and/or the sitting portion 10 in its movement. For example, the braking system is configured to brake the backrest 11 in its movement from the raised position towards the lying position.

Figure 2:
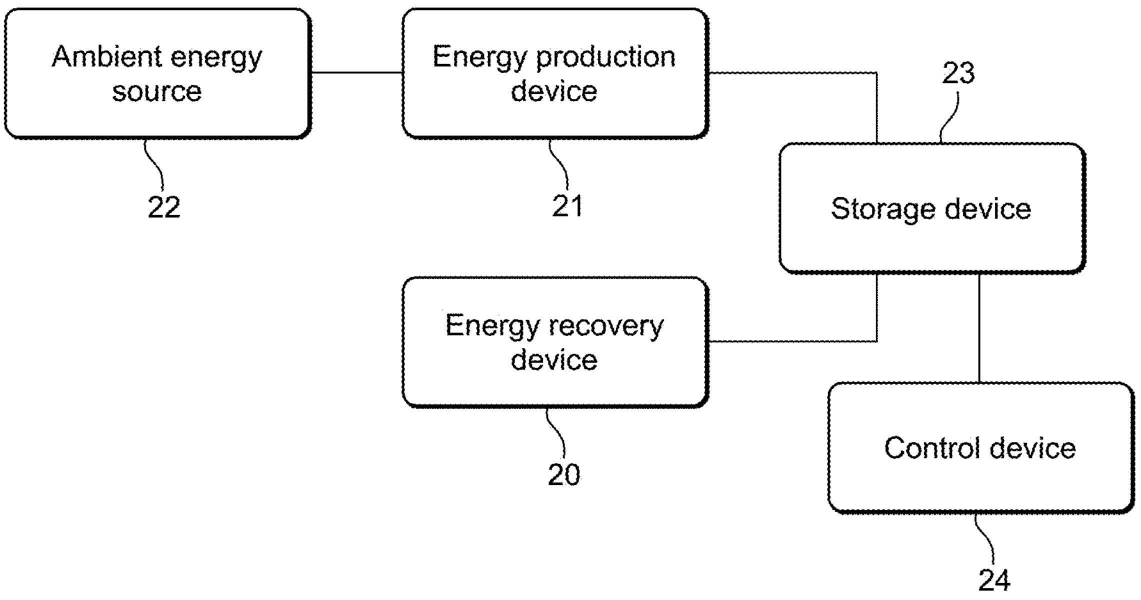
FIG. 2 is a diagram of an electrical management system of the seat.

FIG. 2 shows a diagram of an electrical energy management system according to an aspect of the disclosure.

The actuator 2 comprises an energy recovery device 20.

The energy recovery device 20 is configured to recover kinetic energy produced by the seat and to transform said kinetic energy into electrical energy.

The energy recovery device 20 can recover kinetic energy produced when the backrest 11 passes from one position to another, for example from the raised position into the lying position.

In particular, the energy recovery device 20 recovers the kinetic energy produced during braking by the braking system. For example, the energy recovery device 20 recovers the kinetic energy produced by the braking system during the movement of the backrest 11 from the raised position towards the lying position.

The actuator 2 is reversible. The reversibility of the actuator 2 is used to recover the kinetic energy. For example, the actuator 2 is a rotary actuator.

In another aspect, the actuator 2 may be a non-reversible linear actuator. The linear actuator could then be associated with a disengageable system so as to enable the recovery of the kinetic energy.

The seat 1 includes an energy production device 21, configured to produce electrical energy from an ambient energy source 22.

In particular, the energy production device 21 may be configured to produce electrical energy from an ambient light source.

For example, the energy production device 21 may comprise photovoltaic cells. The ambient energy source 22 is then natural light. In other words, the photovoltaic cells generate electrical energy from natural light. In the aircraft, natural light arrives in particular from the portholes during daytime flights.

Alternatively or in combination with the photovoltaic cells, the energy production device 21 may comprise at least one infrared receiver. The ambient energy source 22 is then an infrared radiation.

In particular, the infrared radiation may originate from the body of the passenger. The infrared receiver is directed towards the backrest 11 and/or the sitting portion 10 in order to capture the human infrared radiation.

In practice, in the aircraft, one or more lamp(s) generally installed in a ceiling light may be replaced by one or more infrared receiver(s).

Alternatively to or in combination with the previous solutions, the energy production device 21 may be configured to produce electrical energy from the ambient noise. The energy production device 21 produces electrical energy in particular from vocal, musical vibrations or vibrations emitted by other ambient noises.

The seat 1 also includes a storage device 23, connected to the production device and to the actuator 2.

The storage device 23 is configured to store the electrical energy originating from the production device and from the actuator 2.

For example, the storage device 23 may be a battery, or a capacitor, or a supercapacitor.

The seat 1 also includes a control device 24.

The control device 24 is configured to control the storage device 23 in order to distribute the stored electrical energy to electronic components of the seat 1.

The control device 24 distributes the electrical energy to the electronic components such as lights, recharging outlets or a TV set. The control device 24 also distributes the electrical energy to the actuator or to the actuators 2 so as to enable the movement of the backrest 11 and/or of the sitting portion 10.

The seat 1 may also comprise a charge-discharge management device.

The charge-discharge management device manages the electrical energy need of the different electronic components as well as that of the storage device 23.

The present disclosure proposes an energy-autonomous and self-sufficient seat thanks to the combined use of the transformation of kinetic energy into electrical energy, and the production of electrical energy from an ambient energy source. The objective of the disclosure is to provide enough energy autonomy.

What is claimed is:

1. A seat including a sitting portion and a backrest articulated to one another, the seat also including at least one electric actuator configured to make the sitting portion and/or the backrest movable, the seat comprising an energy recovery device configured to recover kinetic energy produced by the seat and to transform said kinetic energy into electrical energy, and further including:

- an energy production device configured to produce electrical power from an ambient energy source; and
- a storage device connected to the energy production device and to said at least one actuator, and configured to store the electrical energy originating from the energy production device and from said at least one actuator;

the seat being characterized in that it comprises a braking system configured to brake the sitting portion and/or the backrest in its movement, the energy recovery device being configured to recover the kinetic energy produced during braking by the braking system, wherein the backrest is movable between a raised position and a lying position by means of said at least one actuator, the backrest forming with the sitting portion a substantially flat first angle in the lying position, and a second angle in the raised position, the second angle being smaller than the first angle, the braking system being configured to brake the backrest in its movement from the raised position towards the lying position.

2. The seat according to claim 1, wherein the actuator is reversible and comprises the energy recovery device.

3. The seat according to claim 1, wherein the energy production device comprises photovoltaic cells, the ambient energy source being a natural and/or artificial light.

4. The seat according to claim 1, wherein the energy production device comprises at least one infrared receiver, the ambient power source being an infrared radiation.

5. The seat according to claim 4, wherein said at least one infrared receiver is directed towards the sitting portion and/or the backrest.

6. The seat according to claim 1, further including a control device configured to control the storage device in order to distribute the stored electrical energy to electronic components of the seat.

7. The seat according to claim 1, wherein the storage device is a battery.

8. The seat according to claim 1, wherein the storage device is a capacitor.

* * * * *